March 10, 1970            F. B. SMITH            3,499,580
PRESSURE POUR APPARATUS AND COMPONENT THEREOF
Filed July 2, 1968
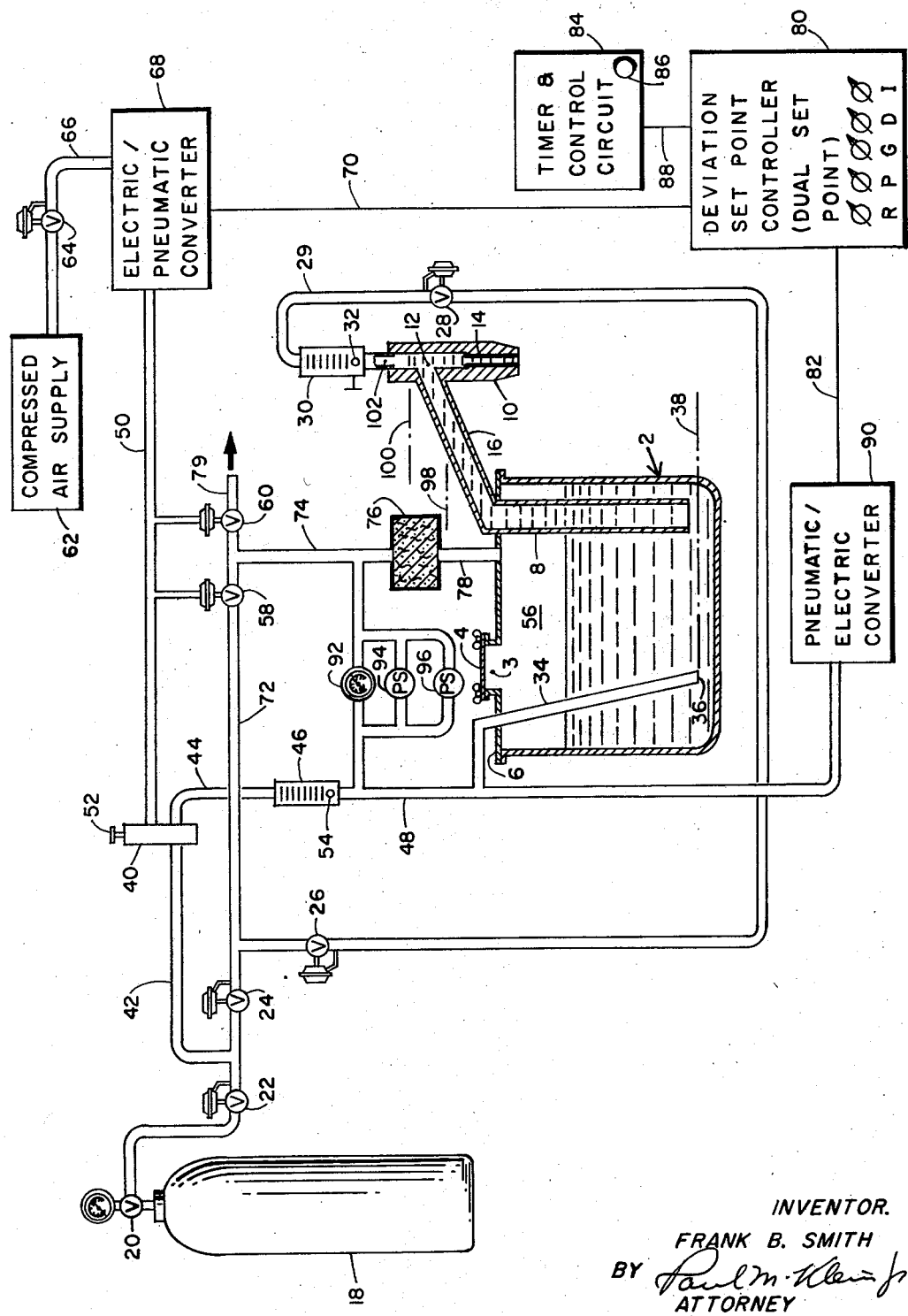
INVENTOR.
FRANK B. SMITH
BY
ATTORNEY

United States Patent Office 3,499,580
Patented Mar. 10, 1970

3,499,580
PRESSURE POUR APPARATUS AND
COMPONENT THEREOF
Frank B. Smith, 712 Kains Ave.,
Albany, Calif. 94706
Filed July 2, 1968, Ser. No. 742,017
Int. Cl. B67d 5/08; G01f 23/00; B22d 17/06
U.S. Cl. 222—61                                    7 Claims

ABSTRACT OF THE DISCLOSURE

Pressure pour apparatus including a bubbler type pressure sensing system, also usable per se in other organizations, in which, to maintain continuous bubbling the flow rate of gas into the bubbler tube is automatically increased during increase of pressure in the liquid at the submerged end of the bubbler tube caused independently of the gas emitted from the bubbler tube. A cushion of gas from a regulated pressure source aids gravity to help maintain a constant head to force liquid out through the pouring orifice. Small pressure changes accompanying emergence of bubbles, amplified and transduced, apply a dither to apparatus-pressurizing valves.

---

This invention relates to pressure pour apparatus for automatically dispensing liquids and to a component thereof, a bubbler tube type pressure sensing system which is usable per se in other organizations as well. The invention is especially applicable to apparatus of the type generally exemplified by U.S. patent application of Rice, Ser. No. 564,953, filed July 13, 1966, now Patent No. 3,395,-833, for automatically pouring more or less accurately measured amounts of molten metal and will, for illustration purposes only, be described in relation to this function, although it is applicable for dispensing liquids in general.

Prior art pressure pour apparatus of the type exemplified by the aforementioned Rice patent application comprises a sealable container with liquid therein to be dispensed and only partially filling the container, and a discharge passageway, with its lower end communicating with the lower region of the interior of the container, and extending upwardly and provided near its other end with a spout having a discharge orifice or the like. After the container is sealed, gas in the container in the space above the liquid forms a cushion which exerts a pressure on the liquid to maintain the liquid elevated in the discharge passageway so that its free surface in the discharge passageway is at a "ready to pour" or "ready" level which is below that which would permit liquid to pour from the spout. To obtain an indication of the pressure forcing the liquid up the discharge passageway, a bubbler tube is provided with its open exit end located below the surface of the liquid. So long as bubbles continue to emerge from the bubbler tube, the pressure in the tube is essentially an indicator of the pressure in the liquid at the submerged end of the bubbler tube and hence, by accounting for the difference in elevation between that submerged end and the submerged end of the discharge passageway, can be used as an indicator of the pressure in the liquid acting to force the liquid up the discharge passageway.

To pour liquid, additional gas, entering through a regulator valve and a conduit separate from the bubbler tube, is supplied to the gas cushion above the liquid in the container to raise the pressure in the gas cushion enough so that the pressure in the liquid is sufficient to raise the liquid level in the discharge passageway to the desired predetermined "pour" level, that is, where it is above the upstream side of the discharge orifice so that it will flow out of the orifice. By endeavoring to maintain constant the pressure head on the liquid which drives it out through the orifice while the apparatus is in the "pour" condition and endeavoring to repeat this driving pressure during equal "pour" cycle time intervals, the apparatus attempts to pour an equal amount of liquid during each repeated "pour" cycle.

The regulator valve operates by remaining open and admitting gas to the container until it senses a back pressure equal to that for which it is preset, at which time it closes and remains closed until the back pressure drops below the regulator's preset value, whereupon it opens again. The regulator valve is connected to sense as its back pressure the pressure in the bubbler tube, and the preset value of pressure of the regulator is chosen to be a pressure just equal to that which would exist in a properly operating bubbler tube when the level of the liquid is being maintained at such a height in the discharge passageway that the desired pressure is being applied to the liquid above, the orifice to drive it out of the orifice.

By failing to repeatably maintain the same pressure head to drive liquid out through the discharge orifice during successive pour cycles, this prior art apparatus fails to control with the desired accuracy the volume of liquid discharged during each pouring operation. This failure can be ascribed to several causes. The impact on the liquid due to the sudden increase in pressure in the gas cushion occurring when gas is admitted through the wide open regulator valve at the initiation of a pour cycle causes the liquid, because of its inertia, to overshoot its desired "pour" level as it rises in the discharge passageway, and then, abetted by the springiness of the gas cushion, oscillates about its steady state "pour" level. The same sudden increase in gas cushion pressure causes the liquid to invade the submerged end of the bubbles tube and rise to some undetermined level in the bubbler tube with concomitant cessation of bubbling. This occurs because the rate of flow of gas into the bubbler tube is insufficient to enable the gas pressure being built up in the bubbler tube to rise fast enough to continuously overcome the increasing pressure in the liquid in the container at the submerged open end of the bubbler tube caused by the increasing gas cushion pressure and tending to force the liquid into the bubbler tube. When the bubbler tube is not bubbling the pressure in it is not a true measure of the pressure in the liquid at the submerged end of it. Hence, the regulator valve which admits gas to the cushion senses as its back pressure a false indication of the pressure in the liquid at the submerged end of the bubbler tube and thus causes further improper gas pressure to be exerted on the liquid with further resultant unforeseen, unplanned pressure head to drive liquid out through the spout orifice. Finally, the inlet regulator valve and the exhaust regulator valve, which vents gas to atmosphere from the gas cushion to ostensibly rapidly terminate pouring at the end of a pour cycle, may both be subject to static friction when they remain at one position for any appreciable length of time. This can produce a need for the application of an excessive force to operate the valves when the time arrives to operate them and this can cause an overshoot or a delay in operation of the valves resulting, on the one hand, in overshoot of liquid head on the spout orifice and, on the other hand, on failure to terminate "pour" pressure quickly enough at the end of a pour cycle.

Objects of the present invention, therefore, are (1) To provide a bubbler tube type pressure sensing system for sensing the pressure in a body of liquid including means for automatically supplying gas to the entrance to the bubbler tube at an increased flow rate during the time when there is an increase in the pressure in the liquid at the submerged end of the bubbler tube due to a cause independent of the gas emitted from said bubbler tube.

(2) To provide an improved pressure pour apparatus for dispensing relatively accurately metered amounts of liquid wherein a bubbler tube is used to sense the pressure at its open end submerged in the liquid in a container and pressure in the liquid, produced by a source separate from the bubbler tube, is used for raising and lowering the liquid level in a discharge passageway, and wherein means are provided to insure continuous bubbling from said bubbler tube including during the time when there is an increase in pressure in said liquid from said separate source.

(3) To provide an improved pressure pour apparatus having a bubbler tube for sensing pressure in a liquid subject to pressure increase caused independently of gas emitted by the bubbler tube, wherein gas supplied to the bubbler tube is furnished by a regulated pressure and controlled flow rate gas supply of which the regulated pressure is caused to vary essentially as a monotonic increasing function of the pressure in the liquid at the submerged end of the bubbler tube.

(4) To provide improved pressure pour apparatus having a container for liquid, a bubbler tube, supplied with gas under regulated pressure, for sensing pressure in the liquid, servo-operated valve means for admitting gas to, and venting gas from, a gas cushion in the container above the liquid, and means under control of the same signal which is applied to the servo-operated valve means for causing the regulated pressure of gas furnished to the bubbler tube to vary as a monotonic increasing function of the pressure in the liquid at the submerged end of the bubbler tube.

(5) To provide improved pour apparatus for discharging liquid through a discharge passageway having a chamber adjacent its exit provided with an orifice so oriented that, during pouring, a body of liquid has a free surface in the chamber and is located above the orifice on the upstream side thereof so that gravity acts on the liquid to urge it through the orifice, the apparatus having means to supply gas to the chamber to establish a cushion during pouring to maintain a substantially constant head to drive liquid out through the orifice and, during and after return to "ready to pour" condition, to envelop the free surface of the liquid in the discharge passageway, blanket the region exterior to the orifice and prevent sucking of the external ambient atmosphere in through the orifice.

(6) To provide a pressure pour apparatus including servo-operated valve means for admitting gas to, and venting gas from, a sealed container having liquid to be dispensed, and including a bubbler tube for sensing the pressure in the liquid, wherein means are provided for sensing and amplifying the relatively small changes in pressure in the bubbler tube occurring during the emission of bubbles therefrom and using these amplifier changes to impose a dither on the valve means.

Other object and many of the attendant advantages of this invention will become apparent by reference to the following description taken in conjunction with the accompanying drawing wherein the single figure is a generally schematic view, partly in cross-section, of a preferred embodiment of the invention.

The invention comprises a sealable container to be partially filled with liquid to be dispensed. A discharge passageway for the liquid has its lower end located in the lower region of the interior of the container and extends upwardly, being provided in the vicinity of its discharge end with a chamber having a discharge orifice so oriented that a body of liquid forced up the discharge passageway into the chamber exhibits a free surface in the chamber and is acted upon by gravity to drive it out through the orifice. A bubbler tube is provided to sense the pressure at its submerged end in the liquid. Servo-operated valve means, through conduit means separate from the bubbler tube, admit gas to, and vent gas from, the container to provide a gas cushion above the liquid in the container exerting an overburden pressure on the liquid. The servo-operated valve means are part of a closed-loop control system for establishing and maintaining the pressure in the liquid in the container at two different magnitudes: the "ready to pour" or "ready" pressure, which is just that required to maintain liquid in the discharge passageway below the level at which it can leave through the discharge orifice, and the "pour" pressure which is that needed to maintain the level of the liquid in the discharge passageway at a height above the discharge orifice sufficient to provide the desired pressure head on the liquid at the dscharge orifice to drive it out through that orifice. The pressure in the bubbler tube is used as indicator of the pressure in the liquid needed by the closed-loop control system to effect its control.

When the controller of the system is set at its "ready" set point, it, in effect, compares the signal established by the pressure in the bubbler tube with the signal which would be established by the bubbler tube when the pressure in the liquid is at the "ready" value. On the basis of any error signal, which is a difference between the two signals being compared, the controller causes the servo-operated valve means to admit gas to, or exhaust gas from, the container to establish and maintain the pressure in the liquid at the "ready" value.

To pour liquid, the controller is switched to its "pour" set point and then, by a process like that just described, causes the pressure in the liquid to increase enough to raise the liquid level in the discharge passageway above the level of the discharge orifice and maintain the pressure head on the liquid at the orifice at the desired value to drive the liquid out through the orifice. An accurately metered volume of liquid is discharged by using a timer to switch the controller from the "ready" set point to the "pour" set point, maintain it at the latter set point for a predetermined time, and then switch it back to the "ready" set point.

To insure that the bubbler tube bubbles continuously so that it will always give a true indication of the liquid pressure at its submerged end means are provided for supplying gas at an increased rate of flow into the bubbler tube whenever there is an increase in he pressure in the liquid produced by a cause separate from the flow of gas out of the bubbler tube.

Gas is supplied to the chamber near the discharge end of the discharge passageway. This gas is supplied to this chamber so as to provide, during pouring, a gas cushion above the free surface of the liquid in the chamber to assist in maintaining a substantially constant pressure head on the liquid at the orifice to drive the liquid out through the orifice. During non-pouring conditions of the apparatus this gas envelops the free surface of liquid in the discharge passageway, blankets the region exterior to the discharge orifice in the vicinity thereof, and prevents sucking in through the discharge orifice of the external ambient atmosphere.

The relatively small changes in pressures in the bubbler tube occurring as bubbles form at and leave from the submerged end of this tube are used to provide a signal which, when amplified, is employed to impose a diether on the servo-operated valve means.

Reference is now made to the drawing for a detailed description of a preferred embodiment of the invention.

A sealable container 2 is used for containing liquid to be dispensed. Although the invention is applicable to dispensing liquids in general, it is especially useful for pouring molten metals. In such a case the container is, in effect, a ladle or furnace and typically has means, not shown, for heating it and its pouring spout to prevent undesired freezing of the metal. The container has an access opening 3, sealable gas-tight with a closure 4, for loading material into the container and for removing material upon occasion. The cover 6 may be removable but, in any event, seals tightly to the main body of the container.

A discharge passageway 8, welded or otherwise sealed to the cover where it passes through the cover, has a portion 10 providing a chamber, generally indicated at 12, having a discharge orifice 14. In a typical construction the portion 10 may be a T attached to the portion 16 of the discharge passageway. From a supply of gas under pressure, such as tank 18, gas is supplied to the upper end of chamber 14 through main valve 20, and a series of regulator valves 22, 24, 26, and 28, which sequentially reduce the maximum available outlet pressures, and thence through conduit 29 and a flow meter 30, having an adjustable needle valve, or the like, operated by knob 32, for controlling the rate of flow of gas.

A regulator valve, such as 22, 24, 26, and 28, is a valve which will open and remain open and thus allow flow through it whenever it senses a back pressure less than the magnitude for which the valve is preset. Whenever it senses a back pressure equal to or greater than its preset value the valve will close and remain closed. The preset pressure is adjustable over a limited range usually specified by the manufacturer of the valve. To describe this behavior, the regulator valve can thus be said to supply fluid under regulated pressure, the regulated pressure being understood to be that maximum back pressure below which the valve remains open. Such a regulator valve is usually, but not invariably, connected so that, as is the case with valves 22, 24, 26, and 28, the back pressure it senses is its own outlet pressure.

To sense the pressure in the liquid a novel bubbler tube type of pressure sensing system is used which is also useful per se in other environments and organizations. The system comprises a bubbler tube 34, whose open exit end 36 is submerged at some convenient level 38 in the liquid in the container 2, and means including a volume booster valve 40 for continuously supplying gas to the bubbler tube at a flow rate such as to maintain continuous bubbling at 36. Gas from tank 18 passes through valve 20, first pressure-reducing regulator valve 22, pipe 42, volume booster valve 40, pipe 44, flow meter 46, and thence through pipe 48 into bubbler tube 34. Volume booster valve 40 is essentially a regulator valve which senses as its back pressure the pressure in pipe 44 and whose regulated pressure is equal to the pressure in compressed air line 50 plus a constant whose value is determined by the setting of control knob 52. That is, the maximum pressure in pipe 44, below which valve 40 will remain open, is the sum of a fixed quantity plus the magnitude of the pressure in line 50. The regulated pressure of regulator valve 22 is chosen so that the maximum pressure available in pipe 42 will always be considerably above the air pressures used in line 50. The flow rate of gas through the flow meter 46 can be controlled by a needle valve whose orifice is adjustable by control knob 54.

Pressure in a cushion 56 of gas in the container 2 above the liquid is controlled principally by servo-operated valve means including inlet valve 58 and exhaust valve 60. Although electric, hydraulic, or other type motors can be used to open and close valves 58 and 60, the variety illustrated is a diaphragm type motor driven by compressed air supplied through line 50 from compressed air supply 62. The pressure of the air from 62 is regulated by regulator valve 64 so that the maximum pressure in conduit 66, the inlet to electric/pneumatic converter 68 is kept at a desired value.

The converter 68, which can be any one of many varities available in the control art, accepts electric control signals over a certain range from line 70 and converts them into proportional pneumatic output signals in the form of air pressure over a certain range in line 50. Typically, with a regulated supply pressure in conduit 66 of, for example, 25 p.s.i.g., input signals ranging from 4 to 20 ma. can be arranged to produce an output pressure in line 50 directly proportional to the input signal and ranging from 3 to 15 p.s.i.g. Valves 58 and 60 are split range valves, with 60 being of the type requiring air pressure to close and 58 being of the type requiring air pressure to open. That is, for example, typically with the pressure in line 50 below say 3 p.s.i.g., valve 60 is open and valve 58 is closed. As the pressure rises to 3 p.s.i.g. valve 60 starts to close while valve 58 remains closed. As the pressure in line 50 continues to rise, valve 60 continues to close and valve 58 remains closed until the pressure reaches say 9 p.s.i.g. at which level valve 60 is fully closed and valve 58 starts to open. As the pressure continues to rise toward the upper limit of 15 p.s.i.g. expected from the converter 68, valve 60 remains closed and valve 58 reaches its maximum opening at a pressure of 15 p.s.i.g. in line 50.

When valve 58 is open and valve 60 is closed, gas from tank 18 emerging from the downstream side of regulator valve 24 can flow through conduit 72, valve 58, conduit 74, filter 76, and conduit 78 into the gas cushion 56. When valve 58 is closed and valve 60 is open gas can exhaust from the gas cushion via conduit 78, filter 76, and valve 60, finally venting to the atmosphere via conduit 79, as shown by the arrow.

The electric signal in line 70 emanates from the deviation set point controller 80 which has two set points, as evidenced by its legend designating it as "dual set point." The controller 80, which may be anyone of many varities available in the control art, accepts an electric signal input from line 82 and compares it with a selected one of two preset values constituting the two set points of the controller, one of these two preset values being determined by the setting of control dial R and the other by the setting of control dial P. A typical suitable arrangement for performing this function is to pass the current fed into controller 80 from line 82 through a resistance. The voltage generated across this resistance is compared with a selected one of two fixed reference voltages, magnitude of each of which latter is determined by the setting of dials R and P, respectively. A relay can be set to normally connect the "R" fixed voltage as the one selected for comparison with the signal from line 82. A timer and control circuit 84, one of many types readily available, has a timer which can be preset to actuate a control circuit at the expiration of a preset time period from the moment of energization. A switch operated by push button 86 energizes the timer and control circuit sending a signal through line 88 to cause the aforementioned relay to disconnect the "R" fixed voltage and switch to connect the "P" fixed voltage as the one selected for comparison with the input signal from line 82. At the expiration of the time period preset on the timer, the timer causes the relay to switch the connection back to the "R" fixed reference voltage.

The deviation or difference between the voltage generated by the signal from line 82 and the selected reference voltage is called the error signal. Upon sensing an error signal, controller 80 generates an output signal appearing in line 70. The magnitude of this output signal is made up of three components based on the error signal in a manner well known in the control art. One component is directly proportional to the magnitude of the error signal and is provided by the fixed gain of the controller 80 determined by the setting of dial G. The second component depends on the time rate of change of the error signal and is provided by the derivative control action of controller 80 determined by the setting of dial D. The third component is based on the time integral of the error signal and is provided by the integral control action of the controller 80 determined by the setting of dial 1.

The electric signal in line 82 is provided by pneumatic/ electric converter 90, many suitable types of which are available in the control art. Converter 90, being connected to pipe 48, senses the pressure in bubbler tube 34 as its input signal and generates an electric output signal fed into line 82 which typically is a linear function of the input pressure. Converter 90 can be adjusted so that when its pressure input is zero, its electric signal output has a finite value.

Differential pressure gauge 92 reads the difference between the pressure in conduit 78 and pipe 48 to give an indication of the level of the liquid in container 2. Differential pressure switch 94 is set to close when the differential pressure it senses indicates that the level of liquid in container 2 is at a desired minimum. It is connected to energize, upon closing, a signal light (not shown) indicating "empty." A similar differential pressure switch 96 is set to close when the differential pressure it senses indicates that the level of liquid in the container 2 is at a desired maximum and it thereupon energizes another signal light (not shown) indicating "full."

Operation

To use the invention, the container 2 is loaded through access opening 3 with the material to be dispensed. This may be molten metal. The closure 4 is then replaced to seal container 2. The main valve 20 is now opened allowing gas from tank 18 to flow through regulator valve 22, pipe 42, volume booster valve 40, pipe 44, flow meter 46, and pipe 48 into bubbler tube 34. Typically the gas used will be inert to the liquid and, in case the liquid is molten metal, will be a gas to cause degassing of the metal in a manner known in foundry practice. The bubbler tube 34 thus serves as a degas tube. Because there is as yet no air pressure signal in line 50, valve 40 establishes regulated pressure of the gas in pipe 44 at a value equal to the constant preset into valve 40 by knob 52. With a particular embodiment this may be say 10 p.s.i.g. The gas from bubbler tube 34 rises through the liquid and displaces the air in the cushion 56 out through conduit 78, filter 76, conduit 74, valve 60 (which is open because there is no air pressure signal in line 50), and finally through conduit 79 to the atmosphere. Removal of air from cushion 56 prevents undesired oxidation of the molten metal. The filter 76 prevents passage of any metal or other foreign matter which might damage valve 60 or clog the passageways. At this time, since the container 2 is not pressurized, the level of the liquid in discharge passageway 8 is no tas shown in the drawing but is at the level of the free surface of the liquid in container 2 beneath cushion 56.

When valve 20 is opened, gas also flows through regulators 24, 26, and 28 and thence through conduit 29, flow meter 30, and out through discharge orifice 14. This gas flow displaces the air in its path, thus presenting a protective inert cover to the surface of molten metal in passageway 8 to prevent oxidation of the metal, filling the chamber 12 to provide an inert atmosphere when metal rises into the chamber 12, and blanketing the region exterior to the orifice 14 to provide an inert atmosphere in any mold which may be in the vicinity to receive molten metal. Typically the regulator 28 may be set to provide a regulated pressure of gas in conduit 29 of a few inches of water column, sufficient to enable the gas to accomplish the desired functions but also conserve the gas for economy.

In addition to serving as a degas tube, the bubbler tube 34 also performs the important function of sensing the pressure in the liquid. Should the liquid simply cover the submerged open end 36 of tube 34 and neither rise in the tube nor back away from the open end, the pressure in the tube 34 can then be said to essentially exactly equal the pressure in the liquid at the level of the open end 36. If the tube 34 starts to form a bubble, then pressure in the tube 34 can be said to slightly exceed the pressure in the liquid at the open end 36. However, for all practical purposes this pressure difference is negligible so that it can, in general, be said that when, and so long as, bubbles are issuing from the tube 34 the pressure in the tube equals the pressure in the liquid at the submerged open end 36 of the tube. Thus, while bubbles are emerging from the bubbler tube 34, the bubbler tube is sensor of the pressure in the liquid at its open submerged end and the pressure in the bubbler tube is an indicator of the said pressure in the liquid. The gas flow rate in bubbler tube tube 34 is adjusted initially by needle valve knob 54 to a value sufficient to product bubbles continuously, so that the tube serves as a true pressure sensor, and serves to produce bubbles at a rate just adequate for degassing so as to economize on the use of inert gas.

The converter 90, converter 68, and controller 80 are now energized with conventional electric power from any convenient source. These three elements are parts of a closed loop control system for automatically establishing and maintaining the pressure in the liquid in container 2 at certain predetermined values. Upon this initial energization, the controller 80 finds itself established at the "ready to pour" or, as often more simply referred to, "ready" set point. Typically this means that internally of the controller 80, by means such, for example, as a relay, the comparator of the controller is connected to source of reference signal whose fixed magnitude is set by dial R. This magnitude is so chosen that, when the system stabilizes, the pressure in the liquid in the container 2 will be just that required to maintain the liquid in the discharge passageway 8 at a level such as 98 where it is ready to pour but not high enough to enter the chamber 12 and actually discharge through the orifice 14.

Also upon the initial energization the converter 90, being acted upon by the pressure in the bubber tube 34, which is the pressure in the liquid at level 38, yields an electric signal output into line 82 whose magnitude is typically a linear function of the magnitude of the input pressure to converter 90 and is typically of the form: output equals input plus a constant. In one embodiment, for example, the input range is 0–7 p.s.i.g. while the corresponding output range is 4–20 ma. The controller 80 compares this output signal of converter 90 with the fixed reference signal of the "ready" set point and when it senses a difference between them, constituting an error signal, emits an output electric signal in line 70 based on the error signal. At the start the error signal is relatively large since the pressure in the liquid is well below that required in the "ready" condition. When the bubbler tube is bubbling, the presure in it is equal to the sum of the pressure in the liquid at its open submerged exit end 36 (that is, at level 38 in the liquid) plus the gas pressure in the cushion 56.

The signal in line 70 enters converter 68 and causes it to establish in line 50, using compressed air supply 62 as a source, an air pressure which typically is directly proportional to the magnitude of the signal in line 70 which, in turn, is the result of the gain action, derivative action, and integral action used by controller 80 in generating the signal in line 70 in response to the sensing of an error signal. The three actions are proportioned, respectively, by control dials G, D, and I. When the air pressure in line 50 rises to the lower limit of the range of split-range valves 58, 60, the valve 60 starts to close. When that air pressure reaches the cross-over point of the range, valve 60 is fully closed terminating the venting of gas cushion 56 to the atmosphere. As the air pressure above the cross-over point, the pressure in the now sealed container 2 begins to rise slightly because of gas entering through tube 34 and quite rapidly as the pressure in line 50 rises to cause increased opening of valve 58 which admits gas from conduit 72 through conduit 74, filter 76, and conduit 78 directly into cushion 56. The regulated pressure of valve 24 may be, for example, say 12 p.s.i.g. and its capacity sufficient to afford a high rate of flow of gas into cushion 56.

As the pressure in cushion 56 rises, so does the pressure in the liquid. The increase in the pressure in the liquid would tend to drive the liquid up into the bubbler tube 34, the pressure in which would then no longer be a true indicator of the pressure in the liquid at its submerged end. However, to prevent this, the invention provides means for automatically supplying gas to the entrance to the bubbler tube at an increased flow rate during the time when there is an increase in the pressure in the liquid at the submerged exit end of the bubbler tube due to a cause, such as flow of gas from 78 into cushion 56, independent of the gas emitted from the bubbler tube. The rate of flow of gas into the bubbler tube is always sufficiently high to maintain a flow of bubbles from the tube so that the presure in the tube is always a true indicator of the pressure in the liquid at the submerged end of the tube.

One embodiment of this means is the volume booster valve 40 and the orifice in flow meter 46 adjusted by knob 54 to control the flow rate. These together constitute a regulated pressure and controlled flow rate gas supply for the gas entering the bubbler tube 34. As, in response to the signal in line 70, the air pressure in line 50 rises, causing consequently a rise in the pressure in the liquid resulting from the closing of valve 60 and the opening of valve 58, this same air pressure causes the booster 40 to correspondingly increase the regulated gas pressure in pipe 44, because the booster is set to maintain the regulated pressure in pipe 44 equal to the sum of a constant plus the magnitude of the pressure in line 50. In a particular embodiment, the value of this constant may be, say, 10 p.s.i.g. Since the pressure in the liquid varies as a monotonic increasing function of the air pressure in line 50, by virtue of the fact that increasing air pressure in line 50 accomplishes increase in pressure in cushion 56, and since the regulated pressure in pipe 44 also varies as a monotonic increasing function of the air pressure in line 50, it is apparent that this illustrated arrangement accomplishes one of the concepts of the invention: to provide means for causing the regulated pressure of the gas supply to the bubbler tube to vary as a monotonic increasing function of the pressure in the liquid at the open exit end of the bubbler tube.

When the pressure in the liquid in container 2 reaches a value sufficient to sustain the molten metal in the discharge passageway 8 at the "ready" level 98, the bubbler tube pressure, through the medium of converter 90, produces in controller 80 an input signal whose value differs by zero from the value of the "ready" set point reference signal in 80. That is, controller 80 now senses zero error signal. However, under these conditions the output of controller 80 is not zero. It is a certain magnitude of current sufficient to cause converter 68 to deliver a pressure output in line 50, corresponding to that magnitude of current, such that valves 58 and 60 will introduce gas to, exhaust gas from, or, by both remaining closed, do neither to the cushion 56 so as to maintain the gas pressure in cushion 56 at such a value that the sum of its value plus the pressure due to the static head of liquid in container 2 at the open end of tube 34 will just equal the "ready" pressure at which it is desired for the bubbler tube to operate at this time. This "ready" pressure in the bubbler tube is just that necessary to balance the sum of the static head due to a column of molten metal extending vertically from level 38 to level 98, desired for the height of the free surface of the metal in "ready" position, plus the (relatively low) overburden pressure on that free surface caused by inert gas flowing through chamber 12 for the purpose of keeping air away from the molten metal.

Theoretically, the system could stabilize in the "ready" condition if the effect of inflow of gas through tube 34 were exactly balanced by leakage of gas out of container 2. However, typically the system hovers about the "ready" value of pressure in cushion 56 so that if that pressure drops (e.g. because of leakage) the corresponding drop in pressure in the liquid is sensed by bubbler tube 34 and is caused to change the signal out of converter 90 so as ultimately to cause valve 60 to close and valve 58 to open until the system returns exactly to the "ready" condition. Similarly, if the pressure in the liquid should rise above the "ready" value, tube 34 would sense it and initiate a change in signal in the closed servo loop to cause valve 58 to close and valve 60 to open to vent container 2 to the atmosphere until the "ready" condition is again attained.

As each bubble is formed at the end 36 of bubbler tube 34, there is a small increase in pressure in the tube above that in the liquid at the open end of tube. This small excess in pressure is necessary to overcome the opposition of the liquid and thus force the gas out of the tube to form a bubble of gas displacing liquid which a moment previously occupied the space where the bubble forms. As the bubble leaves the end of the tube, constituting a loss of gas from the tube, the pressure in the tube falls back to essentially a value just equal to that in the liquid at the open end of the tube. Then, as gas continues to flow into the tube to build up the pressure, the pressure starts to rise again to that slight excess over the pressure in the liquid necessary to form and discharge the next bubble. The invention uses these slight changes in pressure in the bubbler tube 34, acting on converter 90, to produce a signal change amplified in controller 80, to cause converter 68 to impose, in effect, a dither on the valves 58 and 60. A dither is a small force of controlled amplitude and frequency applied to a servo-motored valve so that it is constantly in small amplitude motion and cannot stick at its null position. The dither thus is seen to overcome static friction and render sliding friction more uniform by discouraging the accumulation of foreign matter on sliding surfaces.

To dispense a given quantity of liquid, the timer of timer and control circuit 84 is set for a predetermined time interval and the "pour" push button 86 is pushed, causing a relay to change controller 80 from its "ready" set point to its "pour" set point. This can be accomplished by, for example, energizing a circuit to cause the aforementioned relay to disconnect the "ready" fixed reference signal in the comparator of controller 80 and connect in its place a "pour" fixed reference signal. When the controller 80 compares the signal from 82, established at a value corresponding to "ready" pressure in container 2, it senses a significant error signal and promptly transmits a duly increased signal along line 70 to converter 68. Converter 68 responds by increasing the air pressure in line 50 to adjust valves 58 and 60 to pressurize container 2 to a value sufficient to raise the molten metal in discharge passageway 8 to the desired "pour" level 100.

As the metal rises into the chamber 12 it blocks the egress of gas entering the chamber 12 from conduit 29. Thereupon, in accordance with the concept of the invention, a cushion of gas 102 forms in the chamber 12 above the free surface of the metal in the chamber. This cushion 102 is, in essence, a gas spring. Because of its damping effect it helps prevent undesired overshoot and oscillation of metal rising in discharge passageway to the "pour" level. By proper use of this cushion and judicious adjustment of the G, D, and I dials on controller 80, the metal can be caused to rise from the "ready" to the "pour" level at a relatively uniform rate.

A principal purpose of the invention is to dispense liquid in an amount predetermined with a relatively high degree of accuracy. The total pressure head acting on the liquid at the discharge orifice determines the rate of discharge through the orifice. Accurately sensing this total pressure head and, on the basis of the sensed value, controlling its value during a pour cycle permits of insuring the accuracy of the amount dispensed simply by choosing the proper time interval for the pour cycle. The bubbler tube, used to perform this sensing function, is an accurate indicator of the total pressure head on the orifice when the column of liquid in the discharge passageway 8 behaves essentially hydrostatically but not, for example, if the column of liquid were violently oscillating up and down the passageway. The gas cushion 102, which importantly contributes to maintaining the behavior of the column of liquid in passageway 8 essentially hydrostatic, is thus seen to co-act significantly with the bubbler tube to enable the bubbler tube to act as an accurate indicator of the total pressure head on the discharge orifice.

So long as the pressure in the liquid in container 2 is maintained at the "pour" level, which is accomplished by the closed-loop control system using the bubbler tube 34 to sense any minute changes and promptly initiate corrective action, the metal continues to pour out of the discharge passageway under the urging of a constant pressure head at the orifice 14 equal to the sum of the pressure in the gas cushion 102 plus the static head due to the column of molten metal in the chamber 12 above the orifice. Thus, even though the height of the liquid column above the orifice 14 may vary during the pour cycle, the total pressure head on the orifice remains constant insuring an essentially constant rate of discharge of liquid. It should be noted that this accurate control of the pressure in the liquid during the pouring is, of course, dependent on accurate sensing of the pressure in the liquid so as to enable the closed-loop control system to take corrective action when needed. This accurate pressure sensing is insured by the inventive feature which causes an increased gas flow into the bubbler tube to exist during the time when there is an increase in the pressure in the liquid up to the "pour" value. This keeps the bubbler tube continuously bubbling, making its pressure always a true indicator of the pressure in the liquid at its submerged end.

At the end of the predetermined time interval, the timer in 84 switches controller 80 back to the "ready" set point and the polarity of the error signal then detected by controller 80 causes it to reduce the magnitude of the signal sent along line 70 to converter 68. Thereupon converter 68 accordingly lowers the air pressure in line 50 to allow valve 58 to remain closed and valve 60 to open, venting container 2 to the atmosphere until the pressure therein drops to the "ready" value. When the "ready" pressure is reached, this is sensed by bubbler tube 34 and causes the output signal emitted by converter 90 to be such that controller 80 no longer detects an error signal and therefore stabilizes the system at the "ready" condition.

Since the relatively tight, accurate control of this system enables it to essentially identically repeat its bubbler tube pressure versus time history during the time interval from initiation to termination of a pour cycle, and since it necessarily follows from this that its pressure-head-on-the-discharge-orifice versus time history can also be essentially identically repeated during that same time interval, it is apparent that the system of this invention can repeatedly automatically dispense equal amounts of liquid in equal pouring time periods.

The level of the liquid in the container 2 is indicated by a suitably calibrated dial on the differential pressure gauge 92. This is so because this gauge reads the difference between the bubbler tube pressure and the pressure in cushion 56, and that difference is due to the static pressure head of a vertical column of liquid of a height equal to the vertical distance from the submerged end 36 of the bubbler tube to the free surface of the liquid beneath cushion 56.

Obviously many modifications and variations of the present invention are possible in the light of the above teachings. It is therefore to be understood that the invention can be practiced otherwise than as specifically described.

What is claimed is:

1. A bubbler tube type pressure sensing system for sensing the pressure in a body of liquid at a location where the open exit end of a bubbler tube is submerged in the liquid so as to be subject to the pressure in the liquid at that location, and in which system the pressure in the body of liquid at said location is subject to an increase due to a cause separate from gas issuing from said bubbler tube, comprising a bubbler tube with its open exit end submerged in a body of liquid;

means for supplying gas under pressure to the entrance of said bubbler tube to cause bubbles to form at said submerged end of said tube, whereby the pressure in said tube indicates the pressure in said liquid at said submerged end of said tube; and means for automatically supplying gas to the entrance to said bubbler tube at an increased flow rate during the time when there is an increase in the pressure in the liquid at said submerged end of said bubbler tube due to a cause independent of the gas emitted from said bubbler tube, the rate of flow of gas supplied to the entrance to said bubbler tube being always sufficiently high to always maintain a flow of bubbles from said submerged end of said bubbler tube.

2. A pressure pour apparatus for dispensing liquid comprising:

a sealable container for holding liquid;

a discharge passageway for discharging liquid from said container communicating with the lower portion of the interior of said container and extending upwardly from said container;

means for supplying and controlling gas pressure in said container to raise and lower the liquid level in said discharge passageway;

a bubbler tube having its open exit end located in the liquid to sense the pressure in the liquid at the location of said exit end;

means for supplying to said bubbler tube at the entrance end thereof gas under pressure to cause bubbles to form in said liquid at the exit end of said bubbler tube; and means for automatically supplying gas to the entrance to said bubbler tube at an increased flow rate during the time when there is an increase in the pressure in the liquid at said open exit end of said bubbler tube due to a cause independent of the gas emitted from said bubbler tube, the rate of flow of gas supplied to the entrance to said bubbler tube being always sufficiently high to always maintain a flow of bubbles from said open end of said bubbler tube, whereby the pressure in said bubbler tube is always an essentially accurate indicator of the pressure in said liquid at the open exit end of said bubbler tube.

3. Pressure pour apparatus in accordance with claim 2, characterized by the gas supplied to said bubbler tube being furnished by a regulated pressure and controlled flow rate gas supply, and means for causing the regulated pressure of said last mentioned gas supply to vary essentially as a monotonic increasing function of the pressure in said liquid at the open exit end of said bubbler tube.

4. Pressure pour apparatus in accordance with claim 3 characterized by said means for supplying and controlling gas pressure in said container including servo-operated valve means for admitting gas to, and venting gas from, a gas cushion in said container above said liquid; and the said means for causing the regulated pressure of the gas supply to said bubbler tube to vary is controlled by the same signal which is applied to said servo-operated valve means.

5. Pressure pour apparatus in accordance with claim 4 characterized by means to maintain the magnitude of the said regulated pressure equal to a constant plus an amount directly proportional to the magnitude of said signal applied to said servo-operated valve means.

6. Pressure pour apparatus in accordance with claim 2 characterized by said passageway having a chamber adjacent its exit end provided with an orifice through which liquid is poured from said apparatus;

said orifice being so oriented that during pouring, a body of liquid has a free surface in said chamber and is located above the orifice on the upstream side thereof so that gravity acts on the liquid at the orifice to urge it out through the orifice; and means for supplying as under regulated pressure to said chamber at a location to form a gas cushion above said free surface of said body of liquid exhibited when said body of liquid is in said chamber, said last mentioned means maintaining gas in said chamber during both the time when the level of the liquid in the discharge passageway is below that required for pouring and the time when it is adequate for pouring, and the regulated pressure being such that, during the initiation of and the duration of a pour cycle, the said cushion it forms above the free surface of the said body of liquid is adequate to maintain substantially constant the total pressure head acting to drive liquid out through said orifice, and, during the time when the level of liquid in the discharge passageway is below the pour level, the gas envelops the free surface of the liquid in the discharge passageway, fills the space in the discharge passageway above the level of the liquid including the chamber and the orifice, and also prevents the sucking of the external ambient atmosphere in through the orifice, as well as blanketing the region exterior to the orifice.

7. Pressure pour apparatus in accordance with claim 4 characterized by said servo-operated valve means being part of a closed loop control system in which one of the inputs is the pressure in said bubbler tube;

said closed loop system including means sufficiently sensitive to detect and respond to the change in input constituted by the relatively small rise and fall in pressure in the bubbler tube occurring as each bubble is formed and then leaves the open end of the bubbler tube;

said last named means responding to said change in input by transmitting to said valve means a varying signal to impose a dither on said valve means.

References Cited

UNITED STATES PATENTS 2,633,021  3/1953  Bredtschneider et al. ___ 73—302
3,286,311  11/1966  Rhodes _____ 222—61

SAMUEL F. COLEMAN, Primary Examiner

H. S. LANE, Assistant Examiner

U.S. Cl. X.R.

73—302; 164—306

UNITED STATES PATENT OFFICE
CERTIFICATE OF CORRECTION

Patent No. 3,499,580　　　　　　　　　　　　　　　March 10, 1970

Frank B. Smith

It is certified that error appears in the above identified patent and that said Letters Patent are hereby corrected as shown below:

Column 3, line 56, "amplifier" should read -- amplified --; line 58, "object" should read -- objects --. Column 4, line 62, "diether" should read -- dither --. Column 6, line 70, "1" should read -- I --. Column 7, line 43, "no tas" should read -- not as --. Column 13, line 3, "as" should read -- gas --.

Signed and sealed this 12th day of January 1971.

(SEAL)
Attest:

Edward M. Fletcher, Jr.　　　　　　　　　　WILLIAM E. SCHUYLER, JR.
Attesting Officer　　　　　　　　　　　　　　　Commissioner of Patents